(12) United States Patent
Rozensztejn et al.

(10) Patent No.: US 8,626,718 B2
(45) Date of Patent: Jan. 7, 2014

(54) CONTENT CACHING BASED ON REFRESH AND EXPIRATION TIMES

(75) Inventors: Diego S. Rozensztejn, Brighton, MA (US); Fred Scheer, Bradford, MA (US); Jack Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 126 days.

(21) Appl. No.: 12/915,448

(22) Filed: Oct. 29, 2010

(65) Prior Publication Data

US 2012/0109902 A1     May 3, 2012

(51) Int. Cl.
*G06F 7/00* (2006.01)
*G06F 17/00* (2006.01)

(52) U.S. Cl.
USPC .......................................... 707/663; 707/700

(58) Field of Classification Search
USPC .................................. 707/700, 999.203, 663
See application file for complete search history.

(56) References Cited

U.S. PATENT DOCUMENTS

| | | | | |
|---|---|---|---|---|
| 6,553,409 | B1* | 4/2003 | Zhang et al. | 709/213 |
| 2003/0233423 | A1* | 12/2003 | Dilley et al. | 709/214 |
| 2003/0236826 | A1* | 12/2003 | Islam et al. | 709/203 |
| 2004/0093592 | A1* | 5/2004 | Rao | 717/168 |
| 2006/0020962 | A1* | 1/2006 | Stark et al. | 725/32 |
| 2006/0089917 | A1* | 4/2006 | Strom et al. | 705/59 |
| 2008/0242324 | A1* | 10/2008 | Smuga et al. | 455/466 |
| 2009/0293062 | A1* | 11/2009 | Amir et al. | 718/104 |
| 2010/0005172 | A1* | 1/2010 | Singer et al. | 709/225 |
| 2010/0026510 | A1* | 2/2010 | Kiani et al. | 340/691.3 |
| 2010/0292816 | A1* | 11/2010 | Anzures et al. | 700/94 |

* cited by examiner

*Primary Examiner* — Apu Mofiz
*Assistant Examiner* — Bryan Walker

(57) ABSTRACT

A system for applying time-based refresh and expiration parameters, including user-defined and/or automatically set values, for accessing cached media content and/or retrieving replacement media content for presentation via a communication device.

11 Claims, 13 Drawing Sheets

CONTENT CACHING BASED ON REFRESH AND EXPIRATION TIMES

BACKGROUND

Content providers, such as wireless telephone service providers, permit users to obtain information regarding multimedia content on their mobile devices. An issue with mobile devices is that sometimes the mobile devices lose their network connectivity, or their bandwidth is limited or slow.

DETAILED DESCRIPTION OF PREFERRED EMBODIMENTS

The following detailed description refers to the accompanying drawings. The same reference numbers in different drawings may identify the same or similar elements.

An implementation, described herein, may cache content metadata so that the content metadata can be quickly presented to the user when the user desires the content metadata. Two parameters may be associated with the content metadata in the cache: a refresh parameter and an expiration parameter. The refresh and expiration parameters may be used to determine whether to read content metadata from the cache or to make a data call to a server to obtain new content metadata. As used herein, the term "refresh parameter" may refer to how soon the cache refreshes content metadata. As used herein, the term "expiration parameter" may refer to how long content metadata is to be cached and used before being discarded.

Figure 1:
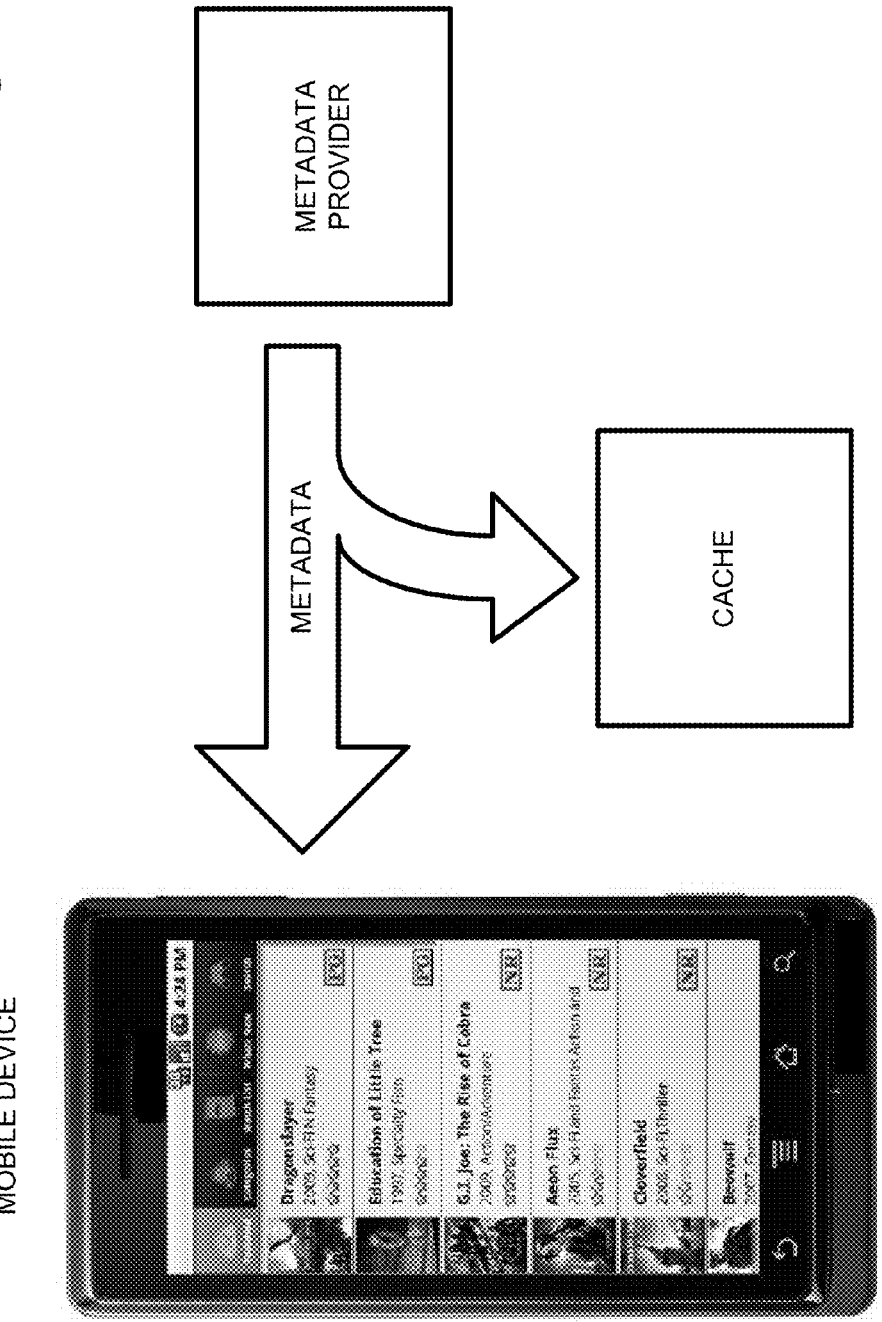
FIG. 1 is a diagram of an overview of an implementation described herein.

FIG. 1 is a diagram of an overview of an implementation described herein. As shown in FIG. 1, a user may use a mobile device to request and obtain content metadata. "Content metadata," as used herein, may refer to information that refers or relates to the content, such as a list of content, a list of categories of content, descriptions of content, or the like. As shown in FIG. 1, a metadata provider may provide the content metadata to the user's mobile device. The content metadata may be stored in a cache associated with the mobile device. Future requests for the content metadata may be satisfied by reading the content metadata from the cache.

As described above, refresh and expiration parameters may be associated with the content metadata in the cache. When the user requests the content metadata from the cache and the age of the content metadata is less than the refresh parameter, then the content metadata, from the cache, may be presented to the user. When the user requests the content metadata from the cache and the age of the content metadata is not less than the refresh parameter and is less than the expiration parameter, then the content metadata, from the cache, may be presented to the user and new content metadata may be obtained from a server and stored in the cache to replace the content metadata. When the user requests the content metadata from the cache and the age of the content metadata is not less than the expiration parameter, then new content metadata may be obtained from a server, the new content metadata may be stored in the cache to replace the content metadata, and the new content metadata may be presented to the user.

The description to follow will describe the content as video content, such as television content, movie content, gaming content, or the like. The term "video content," as used herein, is intended to include video data, which may or may not be combined with audio data. While the description will focus on video content, the description is not so limited and may apply to other types of content, such as audio content (e.g., audio books, music, concerts, etc.).

Figure 2:
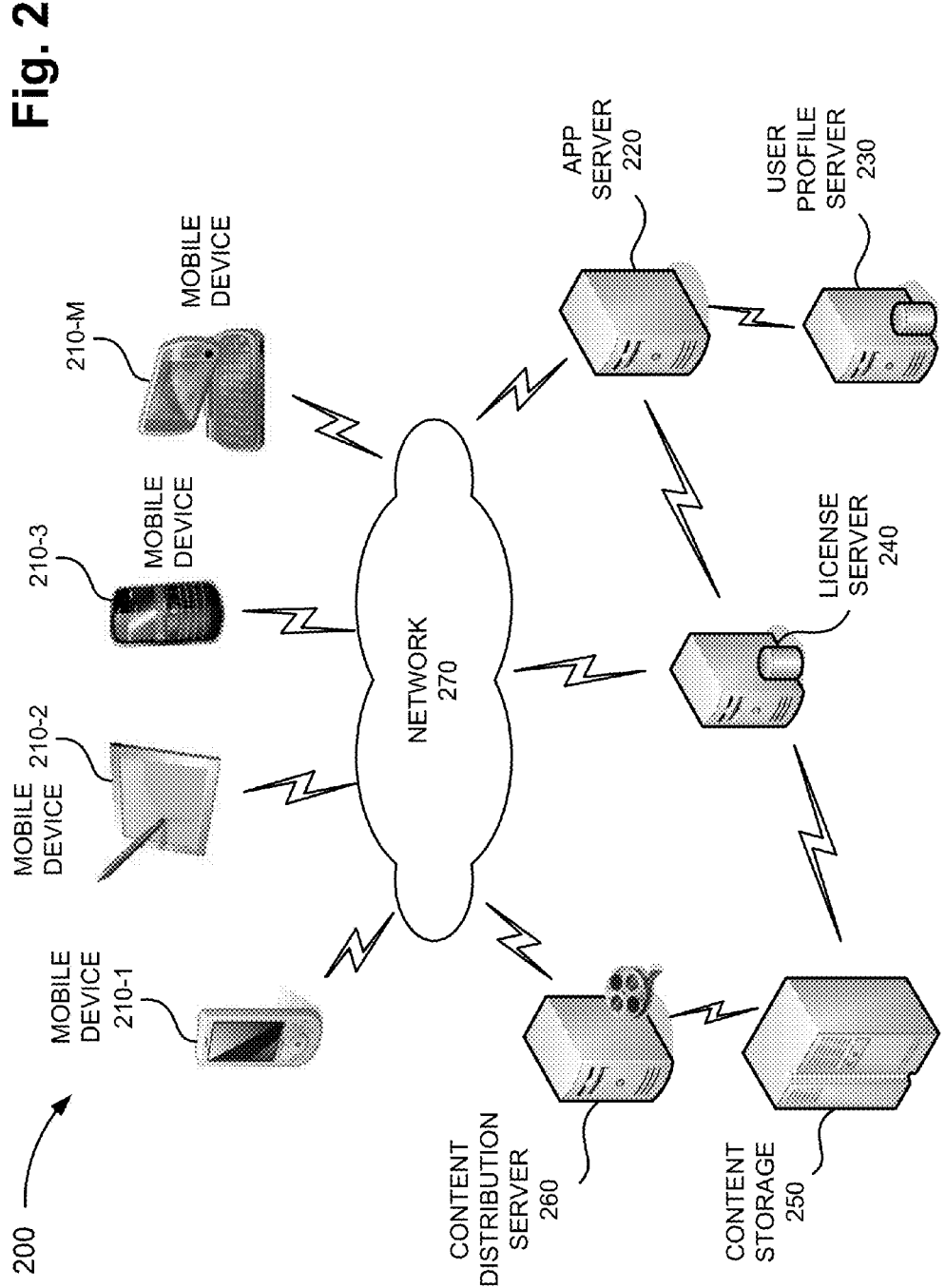
FIG. 2 is a diagram that illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include mobile devices 210-1, 210-2, . . . , 210-M (where M≥1) (collectively referred to as "mobile devices 210," and individually as "mobile device 210"), an application server 220 (hereinafter referred to as "app server 220"), a user profile server 230, a license server 240, content storage 250, a content distribution server 260, and a network 270. While FIG. 2 shows a particular number and arrangement of devices, in practice, environment 200 may include additional, fewer, different, or differently arranged devices than are shown in FIG. 2. For example, each of servers 220-240 or 260 may be implemented as multiple, possibly distributed, devices. Alternatively, two or more of servers 220-240 and 260 may be implemented within a single device.

Mobile device 210 may include any portable device capable of communicating via a network, such as network 270. For example, mobile device 210 may correspond to a mobile communication device (e.g., a mobile phone or a personal digital assistant (PDA)), a portable computer device (e.g., a laptop or a tablet computer), or another type of portable device.

App server 220 may include a server device, such as a computer device, that provides a video content application or performs user authentication, content listing management, or order processing. For example, app server 220 may permit mobile device 210 to download a video content application that may permit a user to find video content of interest or play downloaded or streaming video content. Also, or alternatively, app server 220 may provide video content metadata, such as lists video content, categories of video content, or video content descriptions. Also, or alternatively, app server 220 may authenticate a user who desires to purchase, rent, or subscribe to video content. In one implementation, the interactions between app server 220 and mobile device 210 may be performed using the hypertext transfer protocol (HTTP) or the secure HTTP (HTTPS). In another implementation, the interactions between app server 220 and mobile device 210 may be performed using another type of protocol.

User profile server 230 may include a server device, such as a computer device, that stores user profile information for users. The user profile information may include various information regarding a user, such as login information (e.g., user identifier and password), billing information, address information, types of services to which the user has subscribed, a list of video content purchased by the user, a list of video content rented by the user, a list of video content to which the user has subscribed, ratings of video content by the user, a device identifier (e.g., a mobile device identifier, a set top box identifier, a personal computer identifier) for devices used by the user, a video content application identifier associated with the video content application obtained from app server 220, or the like. App server 220 may use the user profile information to authenticate a user and may update the user profile information based on the user's activity (with the user's express permission).

License server 240 may include a server device, such as a computer device, that provides key and license management. For example, license server 240 may receive a request from a mobile device 210 for a license relating to video content that mobile device 210 has downloaded. The license may include information regarding the type of use permitted by mobile device 210 (e.g., a purchase, a rental, or a subscription) and a decryption key that permits mobile device 210 to decrypt the video content. In one implementation, the communication between license server 240 and mobile device 210 may be conducted over a secure channel, may include public and private keys, or may include other forms of secure communication.

Content storage 250 may include a server device, such as a computer device, or a storage device, such as a database, that stores or processes video content. For example, content storage 250 may perform encoding operations on video content using, for example, public/private keys. Content storage 250 may also perform transcoding operations on the video content. Content storage 250 may store video content in encrypted form.

Content distribution server 260 may include a server device, such as a computer device, that delivers video content to mobile devices 210. For example, content distribution server 260 may permit a mobile device 210 to download particular video content once the user, of mobile device 210, has been properly authenticated. In one implementation, the downloading of video content may occur using the file transfer protocol (FTP). In another implementation, the downloading of video content may occur using another type of protocol.

Network 270 may include any type of network or a combination of networks. For example, network 270 may include a local area network (LAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), an optical network, or a combination of networks. In one implementation, mobile device 210 may download video content via a wireless LAN (WLAN) (e.g., Wi-Fi (wireless fidelity)), a wireless WAN (WWAN) (e.g., EVDO (evolution data optimized)), sideloading (i.e., a transfer between two local devices), or a cable (e.g., USB).

Figure 3:
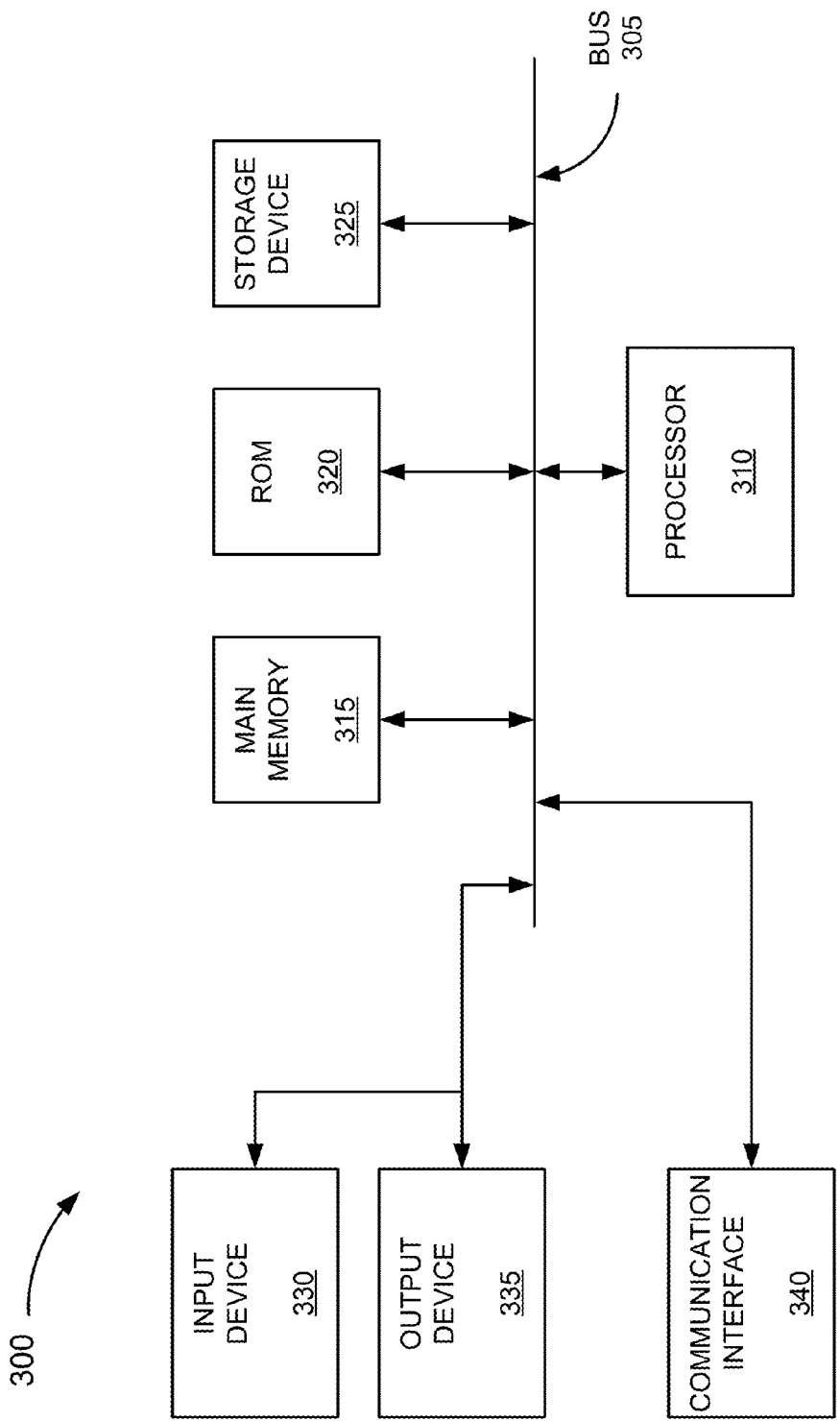
FIG. 3 is a diagram of example components of a device that may be used within the environment of FIG. 2.

FIG. 3 is a diagram of example components of a device 300. Device 300 may correspond to app server 220, user profile server 230, license server 240, content storage 250, or content distribution server 260. Each of app server 220, user profile server 230, license server 240, content storage 250, and content distribution server 260 may include one or more devices 300.

As shown in FIG. 3, device 300 may include a bus 305, a processor 310, a main memory 315, a read only memory (ROM) 320, a storage device 325, an input device 330, an output device 335, and a communication interface 340. In another implementation, device 300 may include additional, fewer, different, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices (e.g., mobile devices 210) or networks (e.g., network 270). In one implementation, communication interface 340 may include a wireless interface, a wired interface, or an optical interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
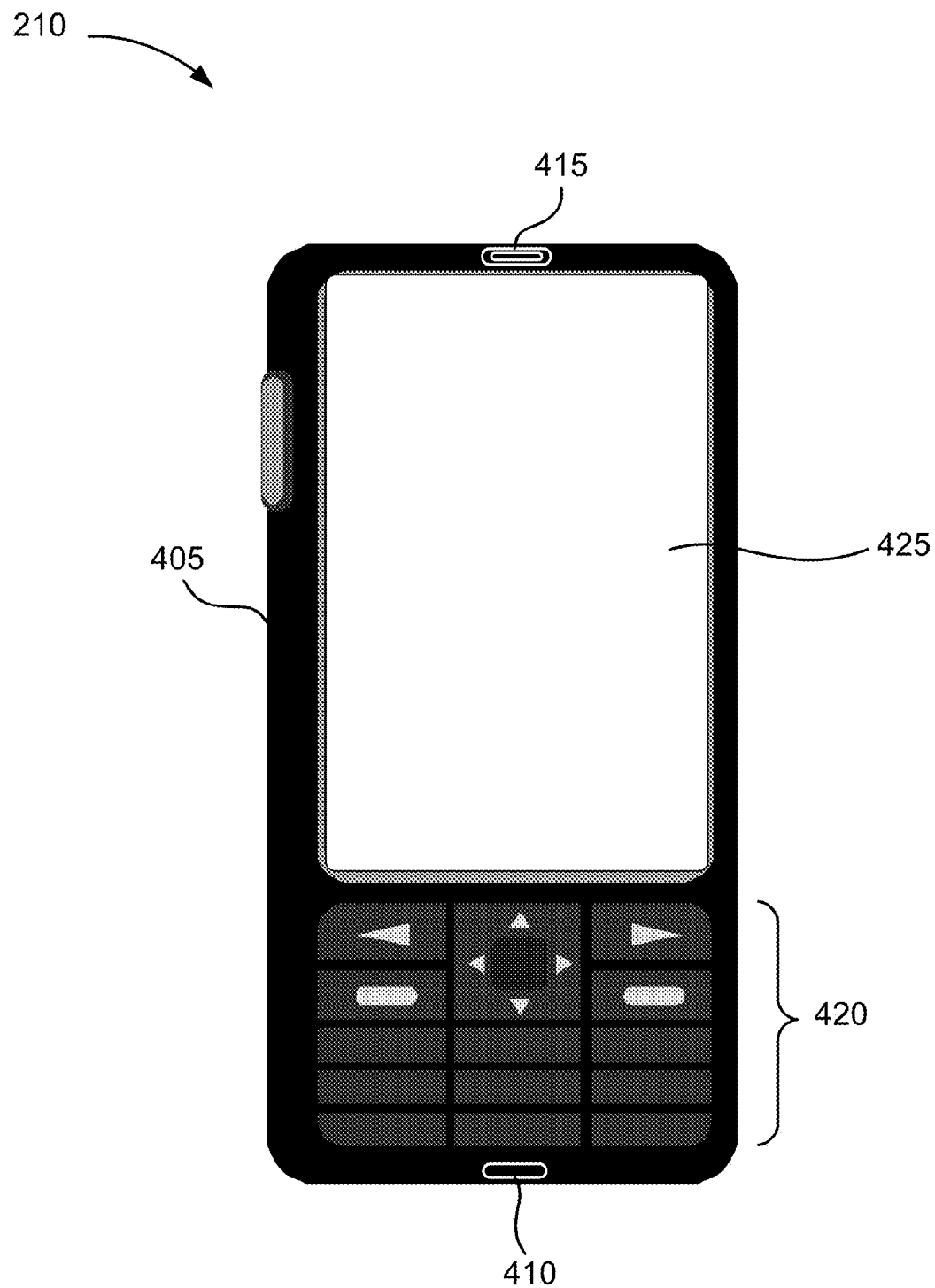
FIG. 4 is a diagram of an example mobile device of FIG. 2.

FIG. 4 is a diagram of an example implementation of mobile device 210. In the implementation shown in FIG. 4, mobile device 210 may correspond to a mobile communication device. Mobile device 210 may include a housing 405, a microphone 410, a speaker 415, a keypad 420, and a display 425. In other implementations, mobile device 210 may include fewer, additional, different, or differently arranged components than those illustrated in FIG. 4 and described herein. For example, keypad 420 may be implemented on a touch screen of display 425.

Housing 405 may include a structure to contain components of mobile device 210. For example, housing 405 may be formed from plastic, metal, or some other material. Housing 405 may support microphone 410, speaker 415, keypad 420, and display 425.

Microphone 410 may include an input device that converts a sound wave to a corresponding electrical signal. For example, the user may speak into microphone 410 during a telephone call or to execute a voice command. Speaker 415 may include an output device that converts an electrical signal to a corresponding sound wave. For example, the user may listen to music, listen to a calling party, or listen to other auditory signals through speaker 415.

Keypad 420 may include an input device that provides input into mobile device 210. Keypad 420 may include a standard telephone keypad, a QWERTY keyboard, or some other type or arrangement of keys. Keypad 420 may also, or alternatively, include one or more special purpose keys. The user may utilize keypad 420 as an input component to mobile device 210. For example, the user may use keypad 420 to enter information, such as alphanumeric text, to access data, or to invoke a function or an operation. As described above, keypad 420 may be implemented not as physical keys, but rather as virtual keys on a touch screen of display 425.

Display 425 may include an output device that outputs visual content, or may include an input device that receives user input (e.g., a touch screen (also known as a touch display)). Display 425 may be implemented according to a variety of display technologies, including but not limited to, a liquid crystal display (LCD), a plasma display panel (PDP), a field emission display (FED), a thin film transistor (TFT) display, or some other type of display technology. Additionally, display 425 may be implemented according to a variety of sensing technologies, including but not limited to, capacitive sensing, surface acoustic wave sensing, resistive sensing, optical sensing, pressure sensing, infrared sensing, gesture sensing, etc. Display 425 may be implemented as a single-point input device (e.g., capable of sensing a single touch or point of contact) or a multipoint input device (e.g., capable of sensing multiple touches or points of contact that occur at substantially the same time).

Figure 5:
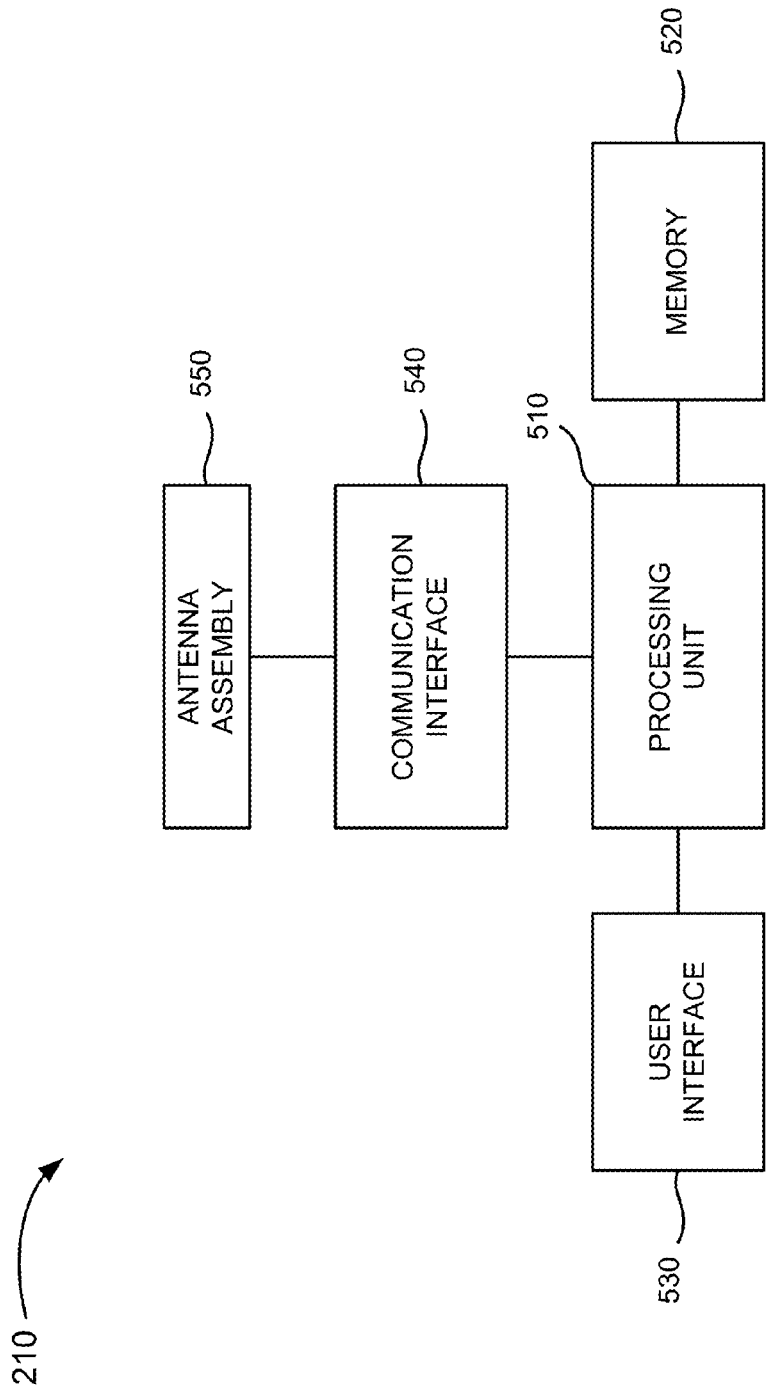
FIG. 5 is a diagram of example components of the mobile device of FIG. 4.

FIG. 5 is a diagram illustrating example components of mobile device 210. As illustrated, mobile device 210 may include a processing unit 510, a memory 520, a user interface 530, a communication interface 540, and an antenna assembly 550. In another implementation, mobile device 210 may include fewer, additional, different, or differently arranged components than those illustrated in FIG. 5. Additionally, in other implementations, a function described as being performed by a particular component of mobile device 210 may be performed by a different component of mobile device 210.

Processing unit 510 may include one or more processors, microprocessors, data processors, co-processors, network processors, ASICs, controllers, programmable logic devices (PLDs), chipsets, FPGAs, or other components that may interpret or execute instructions or data. Processing unit 510 may control the overall operation, or a portion thereof, of mobile device 210, based on, for example, an operating system (not illustrated) and/or various applications. Processing unit 510 may access instructions from memory 520, from other components of mobile device 210, or from a source external to mobile device 210 (e.g., a network or another device).

Memory 520 may include memory or secondary storage. For example, memory 520 may include a RAM, a dynamic RAM (DRAM), a ROM, a programmable ROM (PROM), a flash memory, or some other type of memory. Memory 520 may include a hard disk (e.g., a magnetic disk, an optical disk, a magneto-optic disk, a solid state disk, etc.) or some other type of computer-readable medium, along with a corresponding drive. Memory 520 may store data, applications, or instructions related to the operation of mobile device 210. For example, memory 520 may include a variety of applications, such as a video content application, a navigation application, an e-mail application, a telephone application, a camera application, a voice recognition application, a multi-media application, a music player application, a visual voicemail application, a contacts application, a data organizer application, a calendar application, an instant messaging application, a texting application, a web browsing application, a blogging application, or other types of applications (e.g., a word processing application, a spreadsheet application, etc.). As described above, the video content application may permit a user to find video content of interest; purchase, rent, or subscribe to the video content; or play the video content.

In one implementation, memory 520 may include a cache memory that stores video content metadata. The video content metadata may include a list of available video content, a list of categories of video content, descriptions of video content (e.g., a title of the video content, a release date of the video content, a category of the video content, a length of the video content, a rating of the video content, a synopsis of the video content, a cast list for the video content, a director/producer list for the video content, a trailer associated with the video content, or the like). In one implementation, the cache memory may further include information, corresponding to particular video content metadata, that indicates how long the particular video content metadata has been stored in the cache memory.

User interface 530 may include components for inputting information to mobile device 210 and for outputting information from mobile device 210. Examples of input and output components might include a speaker (e.g., speaker 415) to receive electrical signals and output audio signals, a microphone (e.g., microphone 410) to receive audio signals and output electrical signals, buttons (e.g., keypad 420) to permit data and control commands to be input into mobile device 210, a display (e.g., display 425) to output visual information, or a vibrator to cause mobile device 210 to vibrate.

Communication interface 540 may include, for example, a transmitter that may convert baseband signals from processing unit 510 to radio frequency (RF) signals and/or a receiver that may convert RF signals to baseband signals. Alternatively, communication interface 540 may include a transceiver to perform functions of both a transmitter and a receiver. Communication interface 540 may connect to antenna assembly 550 for transmission and reception of the RF signals.

Antenna assembly 550 may include one or more antennas to transmit and receive RF signals over the air. Antenna assembly 550 may receive RF signals from communication interface 540 and transmit the signals over the air, and may receive RF signals over the air and provide the signals to communication interface 540.

As described herein, mobile device 210 may perform certain operations in response to processing unit 510 executing software instructions contained in a computer-readable medium, such as memory 520. The software instructions may be read into memory 520 from another computer-readable medium or from another device via communication interface 540. The software instructions contained in memory 520 may cause processing unit 510 to perform processes described herein. Alternatively, hardwired circuitry may be used in place of or in combination with software instructions to implement processes described herein. Thus, implementations described herein are not limited to any specific combination of hardware circuitry and software.

Figure 6:
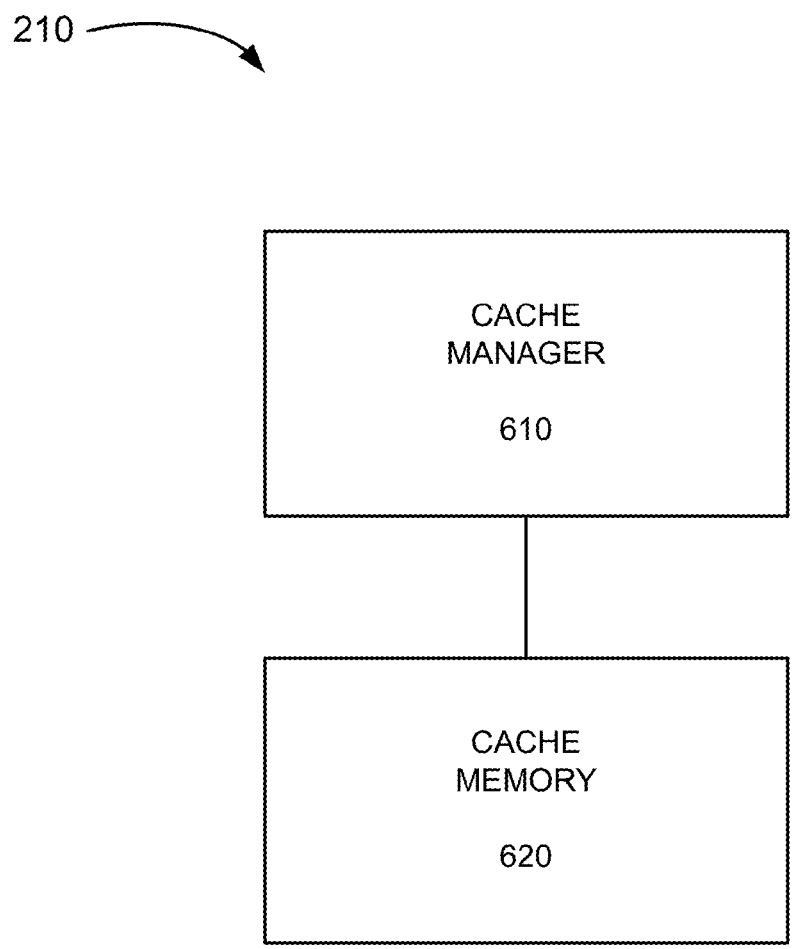
FIG. 6 is a diagram of example functional components of the mobile device of FIG. 4.

FIG. 6 is a diagram of example functional components of mobile device 210. As illustrated in FIG. 6, mobile device 210 may include a cache manager 610 and a cache memory 620. Cache manager 610 and cache memory 620 may be implemented as a combination of hardware and software based on the components illustrated and described with respect to FIG. 5. Alternatively, cache manager 610 and cache memory 620 may be implemented as hardware based on the components illustrated and described with respect to FIG. 5.

Cache manager 610 may set refresh and expiration parameters. The refresh and expiration parameters may be automatically set. Alternatively, a user, of mobile device 210, may be permitted to set the refresh and expiration parameters. In one implementation, the refresh and expiration parameters may differ for different types of video content metadata. For example, for a listing of available video content, a refresh parameter may be set to 24 hours and an expiration parameter may be set to 100 days. In another implementation, the refresh and expiration parameters may be the same for different types of video content metadata. For example, for a list of available video content and for a list of video content categories, a refresh parameter may be set to 2 days and an expiration parameter may be set to 90 days.

Cache manager 610 may manage the storing of video content metadata in cache memory 620, the refreshing of video content metadata within cache memory 620 (e.g., obtaining of new video content metadata to replace stale video content metadata), and the obtaining of video content metadata for storage in cache memory 620.

Cache memory 620 may include a local memory, of mobile device 210, that stores video content metadata. In one implementation, cache memory 620 may store a particular amount of video content metadata. In this implementation, when cache memory 620 is full, new video content metadata may replace the oldest video content metadata. In another implementation, cache memory 620 may use another technique to determine where to store new video content metadata.

Figure 7:
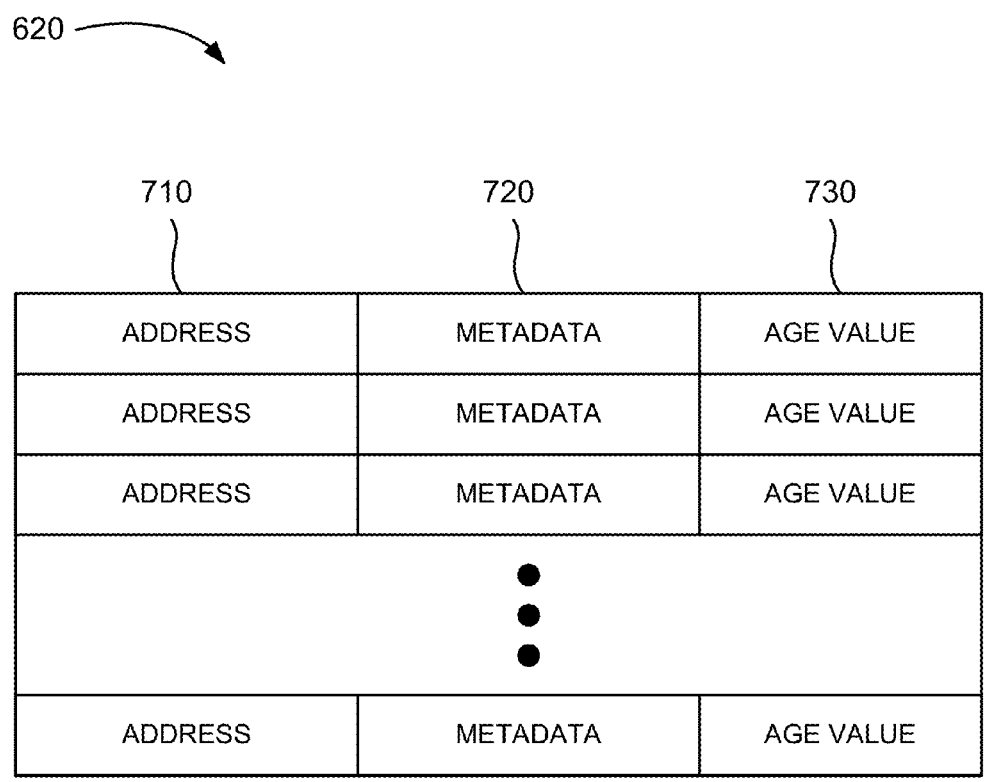
FIG. 7 is a diagram of an example arrangement of data in a cache memory of FIG. 6.

FIG. 7 is a diagram of an example arrangement of data in cache memory 620. As shown in FIG. 7, cache memory 620 may include an address field 710, a metadata field 720, and an age value field 730. In another implementation, cache memory 620 may include additional fields, fewer fields, different fields, or differently arranged fields.

Address field 710 may store an address, such a uniform resource locator (URL), associated with video content metadata available on a server, such as app server 220. Examples of types of video content metadata have been described above. Each entry in address field 710 may correspond to a different type of video content metadata. For example, one entry in address field 710 may correspond to video content metadata relating to a list of available video content; another entry in address field 710 may correspond to video content metadata relating to a list of video content categories; a further entry in address field 710 may correspond to video content metadata relating to video content descriptions; etc.

Metadata field 720 may store video content metadata, or a pointer to video content metadata, relating to the address in address field 710. Examples of video content metadata might include a list of available video content, a list of video content categories, video content descriptions, etc. In one implementation, not all types of video content metadata may be stored in cache memory 620. For example, a trailer, associated with particular video content metadata, may not be stored in cache memory 620. The types of video content metadata to be stored in cache memory 620 may be specified by the video content application or by the user.

Age value field 730 may store information relating to how long the corresponding video content metadata has been stored in cache memory 620. In one implementation, age value field 730 may store a timestamp that indicates a time when the video content metadata was stored in cache memory 620. In another implementation, age value field 730 may store a counter that increments (or decrements) to reflect a number of clock cycles (or the like) that the video content metadata has been stored in cache memory 620.

Figure 8:
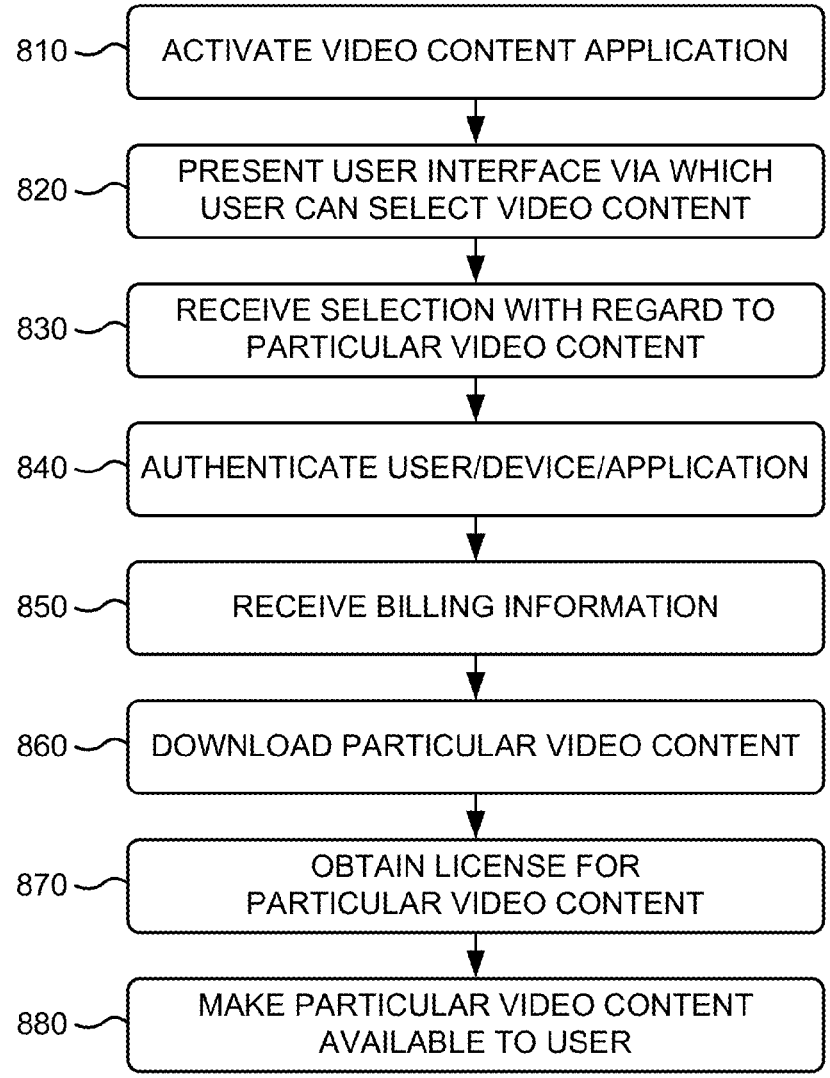
FIG. 8 is a flowchart of an example process for obtaining video content.

FIG. 8 is a flowchart of an example process 800 for obtaining video content. In one implementation, process 800 may be performed by one or more components of mobile device 210, such as processing unit 510 of mobile device 210. In another implementation, one or more blocks of process 800 may be performed by one or more components of another device (e.g., one or more of servers 220, 240, or 260), or a group of devices including or excluding mobile device 210. Process 800 will be described with corresponding references to example user interfaces illustrated in FIGS. 9A and 9B.

Process 800 may include activating video content application (block 810). For example, a user, of mobile device 210, may activate a video content application in a standard manner, such as by selecting an icon (or another type of identifier) associated with the video content application, selecting the name of the video content application from a list, etc.

A user interface may be presented via which the user can select video content (block 820). For example, the video content application may provide metadata regarding available video content in a number of different formats. As shown in FIG. 9A, for example, the video content application may include an option that permits the user to access "featured" video content, an option that permits the user to access a list of categories of video content, an option that permits the user to access a watch list, an option that permits the user to access a "what's new" list, and an option that permits the user to search for video content. The "featured" video content option, when selected, may present a list of popular video content (e.g., popular to the user based on the user's prior purchases, rentals, subscriptions, or ratings, or popular to a group of users based on recent activity of the group of users, based on ratings by the group of users, etc.), video content that is being promoted, or simply available video content. The categories option, when selected, may permit the user to peruse video content by category, such as horror, drama, comedy, R-rated, G-rated, 5-star-rated, 4-star-rated, or other categories of video content. The watch list option, when selected, may present a list of video content that has been previously added to the watch list by the user or that is recommended to the user based on video content in which the user has expressed an interest (e.g., as determined by the user's prior activity). The "what's new" option, when selected, may present a list of video content that has recently become available. The search option, when selected, may permit the user to search for video content by keyword.

Returning to FIG. 8, a selection, with regard to particular video content, may be received (block 730). For example, the video content application may receive selection, by the user, of particular video content from within the presented user interface. In response to the selection by the user, the video content application may present a details user interface relating to the particular video content. The details user interface may include detailed information regarding the particular video content and options for acting upon the particular video content. The detailed information might include information, such as a title of the particular video content, a release date of the particular video content (e.g., a year that the particular video content was released), a category of the particular video content (e.g., a list of one or more categories assigned to the particular video content), a length of the particular video content (e.g., a running length of the particular video content), a rating of the particular video content (assigned by the user or by a group of users), a synopsis of the particular video content, a cast list for the particular video content, a director list for the particular video content, or the like.

The details user interface may also present the user with options to perform an action in relation to the particular video content. For example, the options might include an option to add the particular video content to the watch list, an option to preview the particular video content, an option to rent the particular video content, an option to purchase the particular video content, and an option to subscribe to a service relating to the particular video content. The option to add the particular video content to the watch list, when selected, may add the particular video content to the user's watch list. The option to preview the particular video content, when selected, may cause a trailer, or the like, to be played for the user. The option to rent the particular video content, when selected, may permit the user to access the particular video content for a particular rental period, after which the user may no longer be permitted to access the particular video content. The option to purchase the particular video content, when selected, may permit the user to access the particular video content for an indefinite period of time. The option to subscribe to a service relating to the particular video content, when selected, may permit the user to subscribe to a service via which the particular video content is available. For example, the service relating to the particular video content may correspond to a pay service, such as HBO, Cinemax, Starz, the Howard Stern channel, the NFL RedZone channel, or the like. Once the user subscribes to the service, the particular video content may be available to the user for the subscription period or until the user terminates the subscription.

Figure 9B:
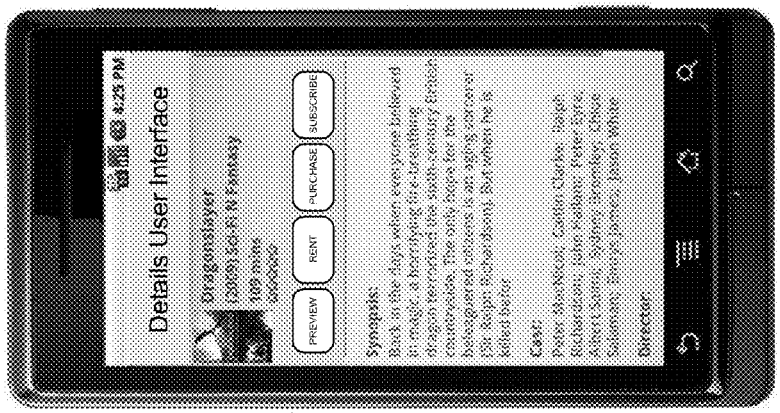
FIGS. 9A and 9B illustrate example user interfaces that may present video content metadata.
Figure 9A:

As shown in FIG. 9A, for example, assume that the user selects the video content entitled "Dragonslayer." As shown in FIG. 9B, a details user interface may be presented with information regarding the video content entitled "Dragonslayer." As further shown in FIG. 9B, the details user interface may permit the user to preview the video content, rent the video content, purchase the video content, or subscribe to a channel relating to the video content. Assume, for this example, that the user has selected to either the rent, purchase, or subscribe option.

Examples of video content metadata are shown in FIGS. 9A and 9B. As described above, cache manager 610 (FIG. 6) may deliver cached video content metadata based on refresh and expiration parameters. The caching operation will be described in more detail with regard to FIGS. 11-13.

Returning to FIG. 8, the user, device, or application may be authenticated (block 840). For example, the video content application may interact with app server 220 to authenticate the user, mobile device 210, or the video content application. For example, the video content application may solicit user login information (e.g., a user identifier (username) and password) from the user. The video content application may provide the user login information to app server 220. App server 220 may compare the user login information to information maintained by user profile server 230 and may authenticate the user when the information matches. Additionally, or alternatively, the video content application may provide device information (e.g., a mobile device identifier) to app server 220. App server 220 may compare the device information to information maintained by user profile server 230 and may authenticate mobile device 210 when the information matches. Additionally, or alternatively, the video content application may provide application information (e.g., an identifier associated with the video content application) to app server 220. App server 220 may compare the application information to information maintained by user profile server 230 and may authenticate the video content application when the information matches.

Billing information may be received (block 850). For example, the video content application may solicit the user to provide billing information. In one implementation, the user may provide credit or debit card information. In another implementation, the user may be permitted to simply add the expense (for the rental, purchase, or subscription) to the user's account with that service provider. In yet another implementation, the user may be permitted to use a payment service, such as PayPal.

Once the user, device, or application has been properly authenticated and billing information has been received, the particular video content may be downloaded (block 860). For example, the video content application may receive, from app server 220, a link (or the like) for requesting the particular content from content distribution server 260. The video content application may follow the link and interact with content distribution server 260 to download the particular video content. Content distribution server 260 may communicate with content storage 250 to obtain the particular video content, in encrypted form, that may then be delivered to mobile device 210. Content distribution server 260 or content storage 250 may communicate with license server 240 to obtain a license identifier corresponding to a license associated with the particular video content. Content distribution server 260 may provide the particular video content and the license identifier to the video content application. The video content application may store the downloaded particular video content, and possibly the license identifier, in a memory associated with mobile device 210 (e.g., memory 520).

A license for the particular video content may be obtained (block 870). For example, the video content application may interact with license server 240, in a secure manner, to obtain a license for the particular video content. In one implementation, the video content application may transmit the license identifier, to license server 240, to identify the particular license that is desired. License server 240 may interact with app server 220 to identify the particular video content for which there has been a purchase, rental, subscription, and to receive user profile information associated with the user of mobile device 210. License server 240 may also interact with the video content application to authenticate the user, device, or application in a manner similar to that described above with regard to block 840. In one implementation, license server 240 may use digital rights management techniques to control access, via a license, to the particular video content. The license may include information regarding use of the particular video content by the user (e.g., whether the user has permanent use (via a purchase) or temporary use (via a rental or subscription)), and a decryption key to permit the encrypted particular video content to be decrypted by mobile device 210.

The particular video content may be made available to the user (block 880). For example, the video content application may use the decryption key (included in/with the license from license server 240) to decrypt the encrypted particular video content. The video content application may then notify the user that the particular video content is available for viewing whenever the user desires.

Reference has been made above to certain operations being performed by the video content application. It should be understood that these operations may actually be performed by processing unit 510 executing the video content application.

Figure 10:
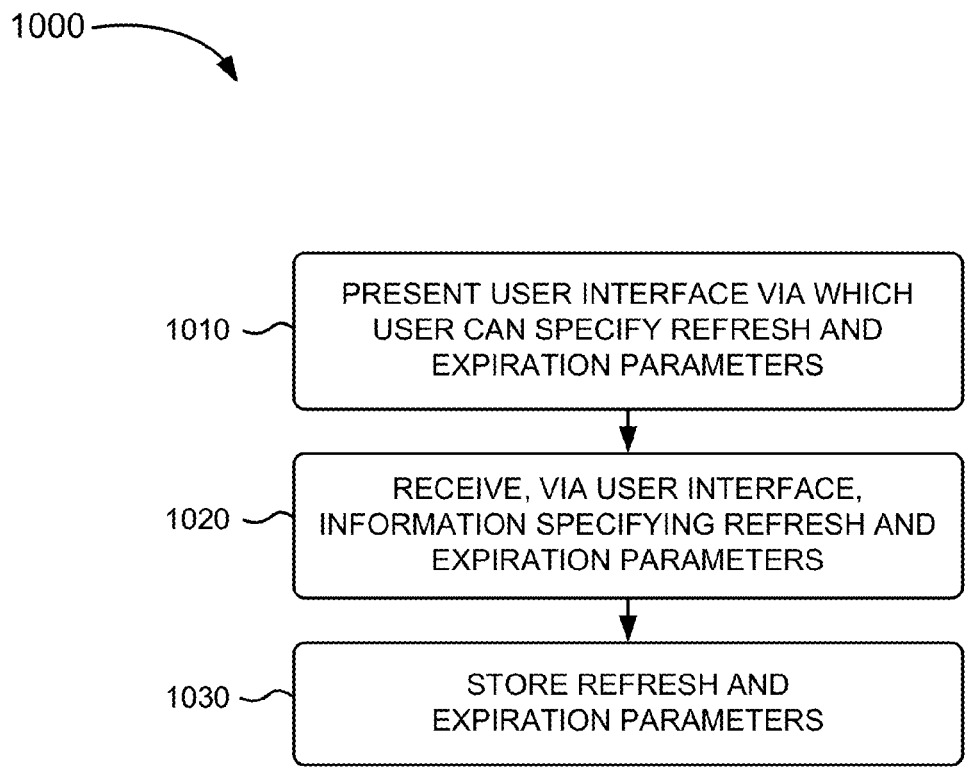
FIG. 10 is a flowchart of an example process for defining refresh and expiration parameters.

FIG. 10 is a flowchart of an example process 1000 for defining refresh and expiration parameters. In one implementation, process 1000 may be performed by one or more components of mobile device 210, such as processing unit 510 of mobile device 210. In another implementation, one or more blocks of process 1000 may be performed by one or more components of another device (e.g., app server 220), or a group of devices including or excluding mobile device 210.

Process 1000 may include presenting a user interface via which a user can specify refresh and expiration parameters (block 1010). For example, cache manager 610 may present the user with a user interface that permits a user to input refresh parameter and expiration parameter values for one or more of the different types of video content metadata (e.g., a list of featured video content, a list of categories of video content, a watch list, and a what's new list, as shown in FIG. 9A). In one implementation, for a refresh or expiration parameter, the user may be presented with a default value and one or more alternative values from which the user may select. In another implementation, for a refresh or expiration parameter, the user may be permitted to input a value.

Information may be received via the user interface (block 1020). For example, cache manager 610 may receive user input, via the user interface, which may define the refresh and expiration parameters. For example, the user might select a refresh parameter and an expiration parameter for one or more of the different types of video content metadata.

The refresh and expiration parameters may be stored (block 1030). For example, cache manager 610 may store the refresh and expiration parameters, for one or more of the different types of video content metadata, in cache memory 620.

Figure 11:
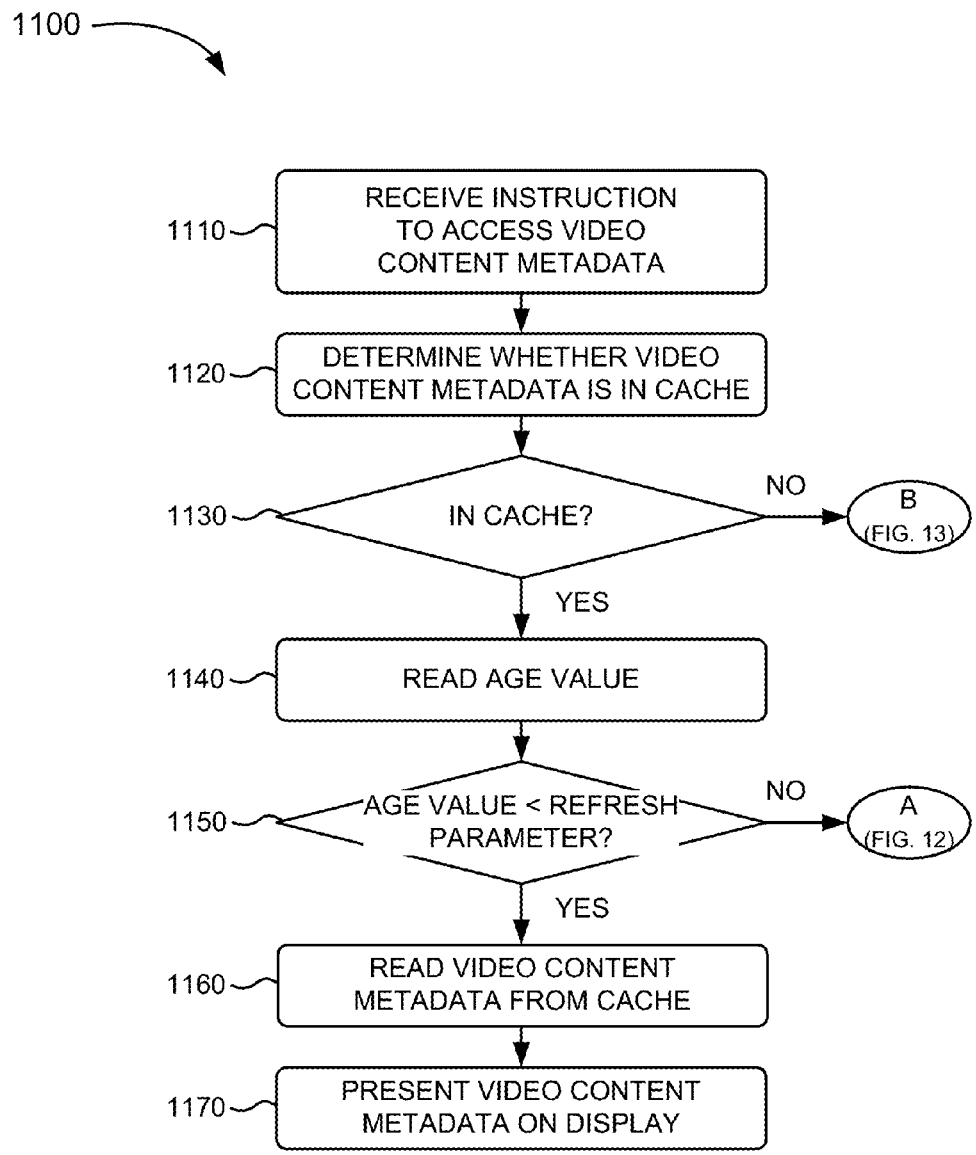
FIGS. 11-13 illustrate a flowchart of an example process for presenting video content metadata on a display.
Figure 12:
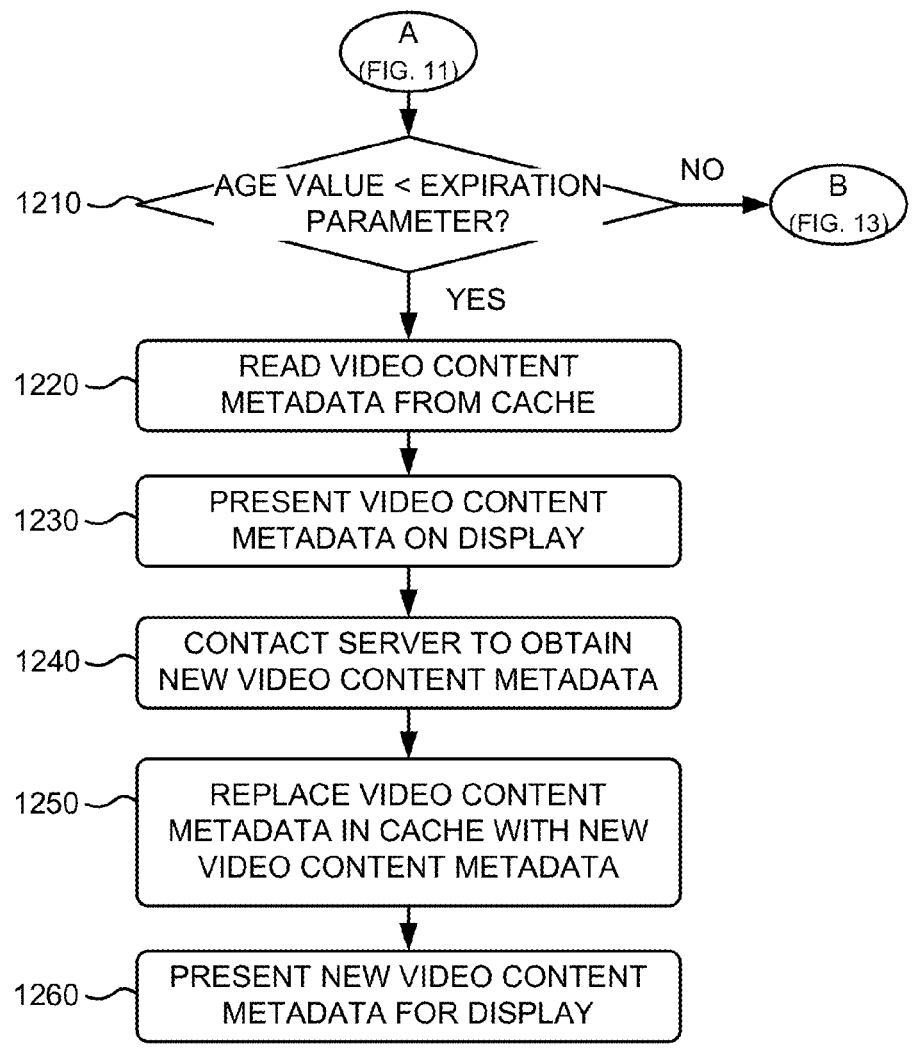
Figure 13:
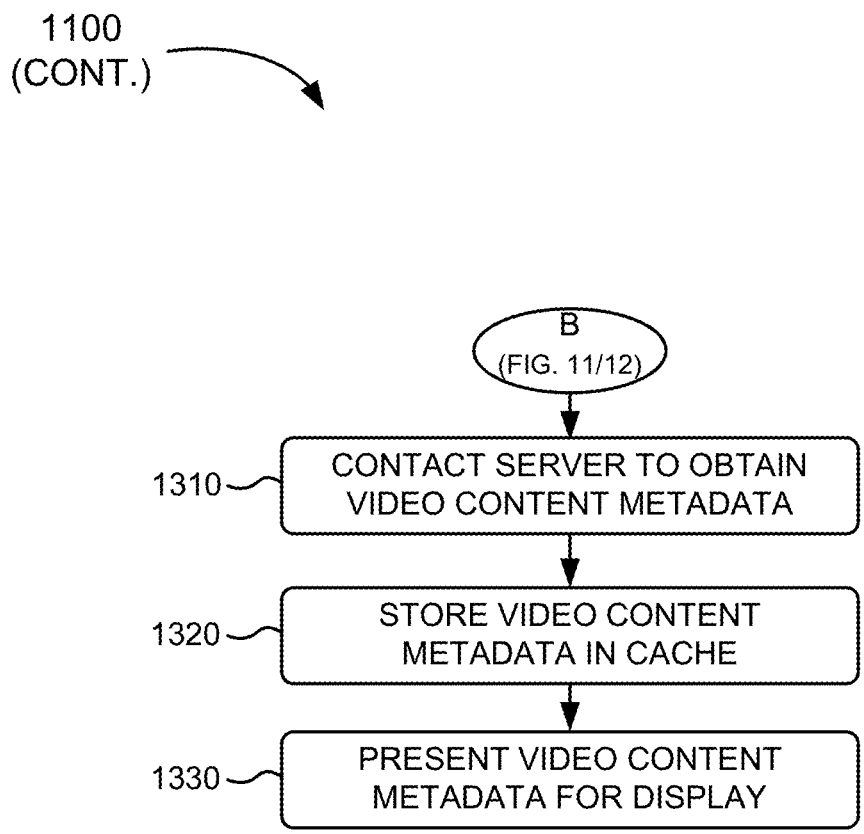

FIGS. 11-13 illustrate a flowchart of an example process 1100 for presenting video content metadata on a display. In one implementation, process 1100 may be performed by one or more components of mobile device 210, such as processing unit 510 of mobile device 210. In another implementation, one or more blocks of process 1100 may be performed by one or more components of another device (e.g., app server 220), or a group of devices including or excluding mobile device 210.

Process 1100 may include receiving an instruction to access video content metadata (block 1110) (FIG. 11). For example, a user, of mobile device 210, may activate a video content application in a standard manner, such as by selecting an icon (or another type of identifier) associated with the video content application, selecting the name of the video content application from a list, etc. In one implementation, activation of the video content application may cause a user interface to be presented on a display associated with mobile device 210. The user interface may present particular (e.g., default) video content metadata on the display. Thus, in this implementation, the instruction to access video content metadata may correspond to an instruction to activate the video content application. In another implementation, the user interface may present an option for selecting particular video content metadata. In this implementation, selection of the option may correspond to the instruction to access video content metadata.

It may be determined whether the video content metadata is stored in the cache (block 1120). For example, cache manager 610 may determine whether cache memory 620 includes an entry that stores the video content metadata in metadata field 720 (FIG. 7). If the metadata is stored in the cache (block 1130—YES), then the age value, of the video content metadata, may be read (block 1140). For example, cache manager 610 may read the age value from age value field 730 of the entry in cache memory 620. Cache manager 610 may also identify the refresh and expiration parameters associated with this type of video content metadata. For example, if the video content metadata corresponds to a list of video content categories, then cache manager 610 may identify refresh and expiration parameters that correspond to the list of video content categories.

If the age value is less than the refresh parameter (block 1150—YES), then the video content metadata may be read from the cache (block 1160) and presented on a display (block 1170). For example, during the time period when the age value is less than the refresh parameter (also referred to herein as the "refresh period"), cache memory 610 may read the video content metadata from cache memory 610 and may provide the video content metadata on display 425 (FIG. 4). In this situation, the video content application need not make a data call to a server (e.g., app server 220) for the video content metadata. Rather, the video content metadata may be served directly from cache memory 620. Thus, for as long as the age value is less than the refresh parameter, any requests for the video content metadata may be served directly from cache memory 620.

If the age value is not less than the refresh parameter (block 1150—NO), it may be determined whether the age value is less than the expiration parameter (block 1210) (FIG. 12). If the age value is less than the expiration parameter (block 1210—YES), then the video content metadata may be read from the cache (block 1220) and presented on a display (block 1230). For example, during the time period when the age value is not less than the refresh parameter and is less than the expiration parameter (also referred to herein as the "pre-expiration period"), cache manager 610 may read the video content metadata from the entry in cache memory 620, and may present the video content metadata on display 425. In this situation, the video content metadata may not include the most recent metadata but may be current enough to serve the metadata right from cache memory 620.

A server may be contacted to obtain new video content metadata (block 1240). For example, cache manager 610 may make a data call (e.g., a HTTP request) to app server 220 to request new video content metadata corresponding to the video content metadata. App server 220 may locate the appropriate video content metadata and may return that metadata to cache manager 610.

The video content metadata, stored in the cache, may be replaced with the new video content metadata (block 1250). For example, cache manager 610 may receive the new video content metadata from app server 220 and may store the new video content metadata in cache memory 620 so as to replace the older version of the video content metadata. Cache manager 610 may also update the age value in age value field 730. For example, if age value field 730 includes a timestamp, then cache manager 610 may store a new timestamp in age value field 730. On the other hand, if age value field 730 includes a counter, then cache manager 610 may reset the counter or set the counter to a particular value.

The new video content metadata may be presented on a display (block 1260). In one implementation, cache manager 610 may immediately replace the displayed video content metadata with the new video content metadata. For example, cache manager 610 may simply refresh display 425 to replace the older version of the video content metadata with the new video content metadata. In another implementation, cache manager 610 may replace the older version of the video content metadata with the new video content metadata upon the occurrence of a particular event. The event may correspond to restarting the video content application (e.g., closing and reactivating the video content application), moving away from the user interface of video content application on display 425 and returning to the user interface on display 425, receiving a new instruction to access the video content metadata (e.g., receiving selection of an option to access other video content metadata and then receiving selection of the option to access the video content metadata), restarting or rebooting mobile device 210 (e.g., turning mobile device 210 off and on), or some other event. In yet another implementation, cache manager 610 may replace the older version of the video content metadata with the new video content metadata upon expiration of a particular amount of time (e.g., replace the video content metadata thirty seconds after obtaining the new video content metadata). The particular technique, used to replace the older version of the video content metadata with new video content metadata, may be configured by the user or may be automatically set (e.g., a default technique). For example, the user may prefer one technique over another.

If the video content metadata is not stored in the cache (block 1130—NO) (FIG. 11) or the age value is not less than the expiration parameter (block 1210—NO) (FIG. 12), a server may be contacted to obtain the video content metadata (block 1310). For example, during the time period when the age value is not less than the expiration parameter (also referred to herein as the "post expiration period") or when cache memory 620 does not store the video content metadata, cache manager 610 may make a data call (e.g., a HTTP request) to app server 220 to request the video content metadata. App server 220 may locate the appropriate video content metadata and may return that metadata to cache manager 610.

The video content metadata may be stored in the cache (block 1320). For example, cache manager 610 may receive the video content metadata from app server 220 and may store the new video content metadata in cache memory 620 (replacing an older version of the video content metadata, if present in cache memory 620). Cache manager 610 may also store an age value in age value field 730. For example, if age value field 730 includes a timestamp, then cache manager 610 may store a timestamp in age value field 730. On the other hand, if age value field 730 includes a counter, then cache manager 610 may set the counter to a particular value.

The video content metadata may be presented on a display (block 1330). For example, cache manager 610 may present the video content metadata on display 425.

An implementation, described herein, may store certain content metadata in a cache. During a refresh period (e.g., when an age value of the content metadata is less than a refresh parameter), the content metadata may be served from the cache with no data calls to the server. During a pre-expiration period (e.g., when an age value of the content metadata is less than an expiration parameter), the content metadata may be served from the cache and a data call may be made to the server to retrieve new content metadata that replaces the content metadata in the cache. During a post expiration period (when an age value of the content metadata is not less than the expiration parameter) or when the cache does not store the content metadata, a data call may be made to the server to obtain the content metadata.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8 and 10-13, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   storing, in a memory associated with a mobile device, a refresh parameter and an expiration parameter;
   receiving, by a processor associated with the mobile device, an instruction to access particular content metadata;
   determining, by a processor associated with the mobile device and in response to the instruction, that the particular content metadata is stored in a cache memory associated with the mobile device;
   determining, by a processor associated with the mobile device and based on the refresh and expiration parameters, whether the particular content metadata has been stored in the cache memory for a time period within a refresh period, within a pre-expiration period, or within a post expiration period;
   presenting, by a processor associated with the mobile device, the particular content metadata from the cache memory without contacting a server when the particular content metadata has been stored in the cache memory for a time period within the refresh period;
   displaying, via a display associated with the mobile device, the particular content metadata from the cache memory and contacting a server to obtain first new content metadata when the particular content metadata has been stored in the cache memory for a time period within the pre-expiration period;
   obtaining, by a processor associated with the mobile device, the first new content metadata in response to contacting the server;
   storing, in the cache memory, the first new content metadata;
   receiving, by a processor associated with the mobile device, user input indicative of one or more preferred events relative to one or more other events,
   replacing, with the first new content metadata, the displayed content metadata on the display, upon detecting a first to occur of the one or more of preferred events, wherein the one or more preferred events are selected from a group comprising:
      closing and then reactivating a particular application on the mobile device, removing a particular user interface from the display and then returning the particular user interface to the display, restarting or rebooting the mobile device, and expiration of a particular amount of time; and contacting a server to obtain second new content metadata, relating to the particular content metadata, and presenting the second new content metadata when the particular content metadata has been stored in the cache memory for a time period within the post expiration period.

2. The method of claim 1, where storing the refresh parameter and the expiration parameter includes:

receiving, from a user of the mobile device, a first value for the refresh parameter, receiving, from the user, a second value for the expiration parameter, and storing the first value and the second value in the memory.

3. The method of claim 1, where the refresh parameter and the expiration parameter are specific to a type of the particular content metadata; and where the method further comprises:

receiving a separate refresh parameter and a separate expiration parameter for another type of content metadata, where the other type of content metadata differs from the type of the particular content metadata.

4. The method of claim 1, where determining whether the particular content metadata has been stored in the cache memory for a time period within the refresh period, within the pre-expiration period, or within the post expiration period includes:

reading an age value that reflects an amount of time that the particular content metadata has been stored in the cache memory, and determining whether the age value indicates that the particular content metadata has been stored in the cache memory for an amount of time that falls within the refresh period, the pre-expiration period, or the post expiration period.

5. The method of claim 4, where, when the particular content metadata has been stored in the cache memory for an amount of time that falls within the pre-expiration period, the method further comprises:

updating the age value based on the storing of the first new content metadata.

6. The method of claim 1, where presenting the second new content metadata when the particular content metadata has been stored in the cache memory for a time period within the post expiration period includes:

replacing the particular content metadata, in the cache memory, with the second new content metadata, and presenting, on the display, the second new content metadata without presenting the particular content metadata on the display.

7. A mobile device, comprising:

a memory to store information associated with particular content metadata and an age value that reflects an amount of time that the information has been stored in the memory; and a processor to:

present a user interface configured to:

present, for selection by a user, a default value and at least one alternative value corresponding to a first amount of time with respect to the particular content metadata, receive, from the user, user input indicative of an input value corresponding to the first amount of time, present, for selection by the user, a default value and at least one alternative value corresponding to a second amount of time with respect to the particular content metadata, and receive, from the user, user input indicative of an input value corresponding to the second amount of time;

receive a request for the particular content metadata, determine, in response to the request, that information associated with the particular content metadata is stored in the memory, read the age value corresponding to the information associated with the particular content metadata, present the particular content metadata without contacting a server when the age value indicates that the information, associated with the particular content metadata, has been stored in the memory for less than the default value, the at least one alternative value, or the input value corresponding to the first amount of time, present the particular content metadata and contact a server to obtain new content metadata when the age value indicates that the information, associated with the particular content metadata, has been stored in the memory for at least the first amount of time and less than the default value, the at least one alternative value, or the input value corresponding to the second amount of time, receive user input indicative of one or more preferred events relative to one or more other events, replace the particular content metadata with the new content metadata upon detecting a first to occur of the one or more preferred events, wherein the one or more preferred events are selected from a group comprising:

closing and then reactivating a particular application via a display associated with the mobile device, removing a particular user interface from the display and then returning the particular user interface to the display, restarting or rebooting the mobile device, and expiration of a particular amount of time, and contact a server to obtain new content metadata, relating to the particular content metadata, and present the new content metadata when the age value indicates that the information, associated with the particular content metadata, has been stored in the memory for at least the second amount of time.

8. The mobile device of claim 7, where, when the age value indicates that the information, associated with the particular content metadata, has been stored in the memory for at least the first amount of time and less than the second amount of time, the processor is to:

store information, associated with the new content metadata, to replace the information, associated with the particular content metadata, in the memory; and update the age value for the new content metadata.

9. The mobile device of claim 7, where, when the age value indicates that the information, associated with the particular content metadata, has been stored in the memory for at least the first amount of time and less than the second amount of time, the processor is to:

refresh a display, associated with the mobile device, to replace the particular content metadata with the new content metadata on the display.

10. The mobile device of claim 7, where, when presenting the new content metadata when the age value indicates that the information, associated with the particular content metadata, has been stored in the memory for at least the second amount of time, the processor is to:
- store information, associated with the new content metadata, in the memory, and
- present, on a display associated with the mobile device, the new content metadata without presenting the particular content metadata on the display.

11. A non-transitory computer-readable medium containing instructions that, when executed by one or more processors, cause the one or more processors to perform a method, the method comprising:

presenting, via a display, a user interface configured to:
- present, for selection by a user, a default value and at least one alternative value corresponding to a first amount of time with respect to a particular type of video content metadata,
- receive, from the user, user input indicative of an input value corresponding to the first amount of time,
- present, for selection by the user, a default value and at least one alternative value corresponding to a second amount of time with respect to the particular type of video content metadata, and
- receive, from the user, user input indicative of an input value corresponding to the second amount of time;

receiving a request for the particular type of video content metadata of a plurality of types of video content metadata;

determining, in response to the request, whether information associated with the particular type of video content metadata is stored in a memory local to the one or more processors;

presenting the particular type of video content metadata for display without contacting a server when the information, associated with the particular type of video content metadata, has been stored in the memory for less than the first amount of time;

displaying the particular type of video content metadata via the display and contacting a server to obtain first new video content metadata when the information, associated with the particular type of video content metadata, has been stored in the memory for at least the first amount of time and less than a second amount of time;

obtaining the first new video content metadata in response to contacting the server;

storing the first new video content metadata in the memory;

receiving user input indicative of one or more preferred events relative to one or more other events;

replacing, with the first new video content metadata, the displayed video content metadata on the display, upon detecting a first to occur of the one or more of preferred events, wherein the one or more preferred events are selected from a group comprising:
- closing and then reactivating a particular application,
- removing a particular user interface from the display and then returning the particular user interface to the display, and
- expiration of a particular amount of time; and contacting a server to obtain new video content metadata, relating to the particular type of video content metadata, and presenting the new video content metadata for display when the information, associated with the particular type of video content metadata, has been stored in the memory for at least the second amount of time.

\* \* \* \* \*